(12) United States Patent
Hopper

(10) Patent No.: US 7,237,095 B1
(45) Date of Patent: Jun. 26, 2007

(54) OPTIMUM POWER EFFICIENT SHIFTING ALGORITHM FOR SCHEDULERS

(75) Inventor: Daniel B. Hopper, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 61 days.

(21) Appl. No.: 11/197,705

(22) Filed: Aug. 4, 2005

(51) Int. Cl.
G06F 9/30 (2006.01)
G06F 9/40 (2006.01)
G06F 12/00 (2006.01)
G06F 1/32 (2006.01)

(52) U.S. Cl. .................. 712/215; 712/205; 712/206; 712/214; 712/217

(58) Field of Classification Search ............... 712/205, 712/206, 214, 217
See application file for complete search history.

(56) References Cited

U.S. PATENT DOCUMENTS

| | | | |
|---|---|---|---|
| 5,555,432 A | 9/1996 | Hinton et al. | |
| 5,651,125 A | 7/1997 | Witt et al. | |
| 5,748,978 A | 5/1998 | Narayan et al. | |
| 5,884,060 A | 3/1999 | Vegesna et al. | |
| 5,996,066 A * | 11/1999 | Yung | 712/221 |
| 6,185,672 B1 * | 2/2001 | Trull | 712/217 |
| 6,704,856 B1 * | 3/2004 | Farrell et al. | 712/215 |

* cited by examiner

Primary Examiner—Eddie Chan
Assistant Examiner—Keith Vicary
(74) Attorney, Agent, or Firm—Meyertons Hood Kivlin Kowert & Goetzel, P.C.; Rory D. Rankin

(57) ABSTRACT

A method and mechanism for managing shifts in a shifting queue. A reservation station in a processing device includes a queue of shifting entries. On a given cycle, zero, one, or two instructions may be dispatched and stored in the queue. Depending upon the dispatch conditions and the state of the queue, existing entries within the queue may be shifted to make room for the newly dispatched instruction(s) at the top of the queue. Shift vectors are generated which identify entries of the queue which are to be shifted and by how much. A queue management approach is adopted in which three rules are generally followed: (i) Only shift entries that must shift due to dispatch pressure from above; (ii) If an entry must be shifted elsewhere, shift it as far down the array as the particular implementation allows; and (iii) Don't allow the previous conditions to force additional entries to shift that are not required to shift by dispatch pressure.

15 Claims, 10 Drawing Sheets

OPTIMUM POWER EFFICIENT SHIFTING ALGORITHM FOR SCHEDULERS

LIMITED COPYRIGHT WAIVER

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2004.

BACKGROUND OF THE INVENTION

1. Field of the Invention

This invention is related to the field of processors and, more particularly, to an efficient shifting mechanism in a queue.

2. Description of the Related Art

Today's microprocessors have many varying, sometimes conflicting, requirements. For example, on the one hand, performance is a prime concern and may override other concerns. On the other hand, power consumption may be a prime concern. In other cases, a balance between performance and power consumption is a goal.

In processors, instruction schedulers are frequently used to keep track of program ordering information—in addition to various other control and data fields which may be required for instruction execution. Although it may be possible for many fields to be stored in static or non-shifting arrays, one approach to determining program order is to store some critical fields in a shifting structure that always maintains program dispatch ordering. In such a case it is generally necessary to design an appropriate shifting algorithm to manage the movement of the elements of the shifting arrays. In a case where only a single instruction or operation may be dispatched to a given scheduler in a clock cycle, the design of an efficient shifting algorithm may be relatively straightforward. However, in the more complex case of dispatching multiple instructions or operations to a single scheduler in one clock cycle, there are many different possible shifting algorithms, many of which may be inefficient in terms of shifting and power consumption.

Accordingly, an efficient method and mechanism for shifting data in queues or arrays is desired.

SUMMARY OF THE INVENTION

A method and mechanism for managing shifts in a shifting queue are contemplated.

In one embodiment, a reservation station in a processing device includes a queue of shifting entries. Each cycle, zero, one, or two instructions may be dispatched and stored in the queue. Depending upon the dispatch conditions and the state of the queue, existing entries within the queue may be shifted to make room for the newly dispatched instruction(s) at the top of the queue. Generally speaking, the state of the queue is continually examined and shift vectors calculated in anticipation of subsequently dispatched instructions. A first group of shift vectors is calculated in anticipation of the dispatch of only a single instruction. A second group of vectors is calculated in anticipation of the concurrent dispatch of two instructions. Subsequently, when a dispatch is detected, the previously generated vectors are utilized for the appropriate dispatch case—either single or double.

Also contemplated is a queue management approach in which certain rules are generally followed. In one embodiment, the rules include the following: (i) Only entries that must be shifted due to dispatch pressure from above are shifted; (ii) If an entry must be shifted, shift it as far down the queue as possible given the particular implementation; and (iii) Do not allow the previous condition to force additional entries to shift that are not required to shift by dispatch pressure.

In one embodiment, calculating the first group of shift vectors in anticipation of a single dispatch involves examining the state of the queue for the existence of two regions. The first region, occupying the top of the queue, must shift by at least one to accommodate the single dispatched instruction. However, if the first region can shift by two without requiring other entries to shift, entries in the first region are shifted by two. Calculating the second group of shift vectors in anticipation of a single dispatch involves examining the state of the queue for the existence of three regions. The first regions occupies the uppermost portion of the queue and is separated from the second region by a single available entry. In order to accommodate the two dispatched instructions, the entries of the first region must shift by at least two, and the entries of the second region must shift by at least one, thereby closing the gap between the first and second regions. If the entries of the second region can shift by two, then the entries of the first region are shifted by two, and the entries of the second region are shifted by two, thereby retaining a gap between the first and second regions.

BRIEF DESCRIPTION OF THE DRAWINGS

Other objects and advantages of the invention will become apparent upon reading the following detailed description and upon reference to the accompanying drawings in which.

Figure 1:
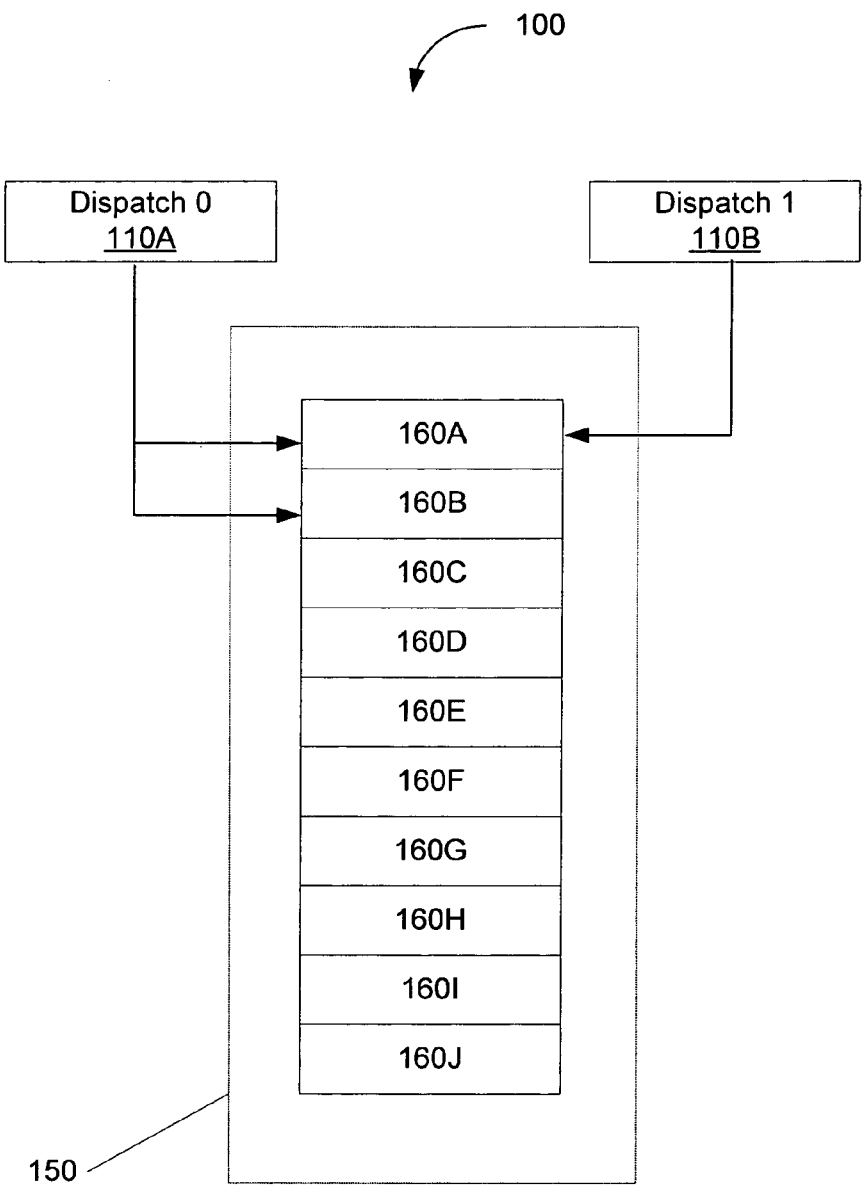
FIG. 1 depicts one embodiment of two dispatch positions and a reservation station.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 depicts one embodiment of an apparatus 100 including a reservation station 150 in a processor and two dispatch positions 110A and 110B. In the example embodiment shown, the reservation station 150 includes ten entries, 160A-160J. However, it is to be understood that reservation station 150 may include any number of entries as deemed appropriate.

Each of the dispatch positions 110A-110B is configured to store an instruction/operation for conveyance to the reservation station 150. On any given clock cycle, dispatch stations 110 may convey zero, one, or two instructions to the reservation station 150 for storage in one of the entries 160. As shown in the example, dispatch position zero 110A is coupled to both of entries 160A and 160B, and dispatch position one 110B is coupled to entry 160A. In one embodiment, on cycles where only a single instruction is being dispatched to the reservation station 150, apparatus 100 is configured to dispatch the single instructions from dispatch position zero 110A to reservation station 150 entry 160A. On cycles where two instructions are being dispatched to the reservation station 150, apparatus 100 is configured to dispatch one instruction from dispatch position zero 110A to reservation station 150 entry 160B, and the other instruction from dispatch position one 110B to reservation station 150 entry 160A.

In addition to the above, as instructions are dispatched only to entries 160A and possibly 160B, there must not only be space available in the reservation station 150 for a dispatched instruction, entry 160A, and if necessary 160B, must be available. Therefore, reservation station 150 may be configured to shift entries 160 which are occupied in order to create an available entry in entry position 160A for a single instruction dispatch, and entry positions 160A-160B for a double instruction dispatch. As shifting entries 160A-160J may entail the activation of a relatively significant amount of associated logic, shifting operations may consume significant amounts of power. Therefore, an approach which dispatches and performs shifts in a relatively efficient manner is desired and is described in the following. Elements referred to herein with a particular reference number followed by a letter may be collectively referred to by the reference number alone. For example, entries 160A-160J may be collectively referred to as entries 160.

As may be appreciated, instructions may only be dispatched to the reservation station 150 if the reservation station 150 has space available. Accordingly, if one instruction is to be dispatched, then the reservation station 150 must have at least one entry 160 available. Similarly, if two instructions are to be dispatched, reservation station 150 must have at least two entries 160 available. In one embodiment, apparatus 100 includes a flow control mechanism to ensure that no instructions are dispatched to the reservation station 150 unless space is available.

A number of approaches to managing the reservation station 150 are possible. In one embodiment, reservation station 150 is configured to shift entries from the top 160A toward the bottom 160J only when an entry is dequeued. In such an embodiment, a newly dispatched instruction is not permitted to be stored in the reservation station 150 unless space is currently available in entry 160A and/or 160B for the new instruction. While such an approach may seem a good approach to reducing the amount of shifting involved, such an approach may generally result in poor utilization of the queue, and poor overall throughput or performance as well. Alternatively, entries in the reservation station may shift only as necessary due to pressure from above (i.e., newly dispatched instructions). Therefore, if a single instruction is dispatched, only enough shifting to create a single available space is performed. Similarly, if a double dispatch is detected, only enough shifting to create two spaces is performed.

In an alternative approach, rather than paying attention to dispatch "pressure" from above as a cue to when shifting is necessary, a more aggressive approach may instead shift allocated entries downward as far and as fast as the shifting structure allows. So for example, entry 160I is shifted into 160J if 160J is empty. 160H shifts into 160J if 160I and 160J are empty, and so on through the top-most entry. However, this more aggressive approach may be a relatively power-hungry approach toward managing allocation which is not desired in particular case.

In yet another alternative, a more efficient approach attempts to reduce the shifting frequency by taking into account "dispatch pressure" from above and only shifting entries downward when required. By reducing the amount of shifting that occurs, power consumption may be reduced. Dispatch pressure requires that empty locations be made available at the top of the reservation station for the dispatched instructions. Three dispatch scenarios are allowed: dispatching zero instructions, one instruction, or two instructions in a single clock cycle. Calculating the shifts required for the zero dispatch case is simple as nothing is shifted in this approach. No dispatch pressure exists and so nothing within the reservation station needs to be relocated. The single dispatch case is only slightly more complicated. Since a single dispatched instruction is always shifted into the top-most entry, only entries that need to move downward to make way for the single dispatched instruction are shifted elsewhere, and they are only shifted downward by one. Generally speaking, this amounts to shifting all top-justified entries downward by one entry until the first available space ("hole") is encountered. Since nothing below the hole has to move to make room for the single dispatched instruction, nothing below the hole is affected by the dispatch.

The dual dispatch case in this more efficient approach is more complicated as it is necessary for some entries to shift downward by two in some scenarios. If there are two or more holes in the reservation station above a particular entry "i" (e.g., if in FIG. 1 the particular entry "i" is entry 160E, then entry 160A is four positions above entry 160E and may be referred to as entry "i+4"), then nothing needs to shift into entry i (or any entry below i) at all. This is due to the fact that the two holes above provide enough free space to accommodate all the occupied entries above i as well as the two dispatched instructions. If there is only one hole above entry i, then entry i will be shifted into by entry i+1 (if entry i+1 is occupied). If there are no holes at all in the array above entry i, then entry i will be shifted into by entry i+2.

While this more efficient shifting approach may reduce power consumption versus the aggressive approach described above, it has a few weakness that prevent it from being truly optimal from a power standpoint. For example, it is true that it only shifts occupied entries when the entry must move to make way for dispatched instructions entering from above. However, while it does shift the minimum number of entries on a clock-by-clock basis, it may fail to achieve the minimum required shifts over a sequence of clock cycles that a particular dispatch sequence requires.

Therefore, what may be a more optimal approach in terms of power consumption is described herein. Generally speaking, the optimal approach may be stated by the following:

(i) Only shift entries that must shift due to dispatch pressure from above;

(ii) If an entry must be shifted elsewhere, shift it as far down the array as the particular implementation allows; and (iii) Don't allow the previous conditions to force additional entries to shift that are not required to shift by dispatch pressure.

The following two tables depict the effect of the "more efficient" approach described above to the "optimal" approach. The first column in the table ("cycle") indicates a particular cycle. The second and third columns indicate the presence ("1") or absence ("0") of an instruction for dispatch in the corresponding dispatch position. The Queue State column indicates which entries of a ten entry queue are occupied ("1") or empty ("0"). The shift1 and shift2 columns include vectors which indicate which entries of the queue will be shifted into by either a single shift or a double shift, respectively. Finally, the last column indicates the number of shifts performed.

TABLE 1

Dispatch Example 1-More Efficient Approach

| cycle | dis1 | dis0 | Queue State[9:0] | shift1[9:0] | shift2[9:0] | # of shifts |
|---|---|---|---|---|---|---|
| n | 0 | 1 | 1000100010 | 1100000000 | 0000000000 | 2 |
| n + 1 | 0 | 1 | 1100100010 | 1110000000 | 0000000000 | 3 |
| n + 2 | 1 | 1 | 1110100010 | 0000010000 | 1111100000 | 6 |
| n + 3 | | | 1111110010 | | | — |
| | | | Total Shifts | | | 11 |

In Table 1 above at cycle n, a single instruction is to be dispatched from dis0. The uppermost entry of the queue at time n is occupied, therefore entries of the queue must be shifted to make room for the new instruction. Therefore, shift1 indicates that the top two entries will be activated to receive a shift of one. The shift2 vector indicates that none of the entries are shifted by two. Accordingly, two shifts are required at cycle n. On cycle n+1, another single instruction is to be dispatched. Again, shifting in the queue is required as the top entry is occupied. In order to make room for the new instruction, shift1 indicates that the top three entries are to be activated for a shift of one. Shift2 indicates no entries are shifted by two. Therefore, 3 shifts are required for cycle n+1. Next, on cycle n+2, two instructions are to be dispatched. Therefore, the queue must shift entries to make room for both instructions. In order to accomplish this, the entry fifth from the top of the queue must be shifted by one (as indicated by shift1), and the upper five entries are activated to receive a shift by two (as indicated by shift2). Therefore, 6 shifts are required at cycle n+2. The total number of shifts in this sequence is 11. Table 2 below includes the same sequence of events as depicted in Table 1. However, Table 2 utilizes the optimal shifting approach which is shown to reduce the number of shifts over a sequence.

TABLE 2

Dispatch Example 1-Optimum Approach

| cycle | dis1 | dis0 | Queue State[9:0] | shift1[9:0] | shift2[9:0] | # of shifts |
|---|---|---|---|---|---|---|
| n | 0 | 1 | 1000100010 | 0000000000 | 0110000000 | 2 |
| n + 1 | 0 | 1 | 0110100010 | 1000000000 | 0000000000 | 1 |
| n + 2 | 1 | 1 | 1110100010 | 0000000000 | 1111101000 | 6 |
| n + 3 | | | 1111101010 | | | — |
| | | | Total Shifts | | | 9 |

In Table 2 above at cycle n, a single instruction is to be dispatched from dis0. The uppermost entry of the queue at time n is occupied, therefore entries of the queue must be shifted to make room for the new instruction. However, while the uppermost entry must shift by at least one, it can shift by more. Therefore, the shift2 vector indicates that the second and third entries from the top are activated to receive a shift by two. In other words, the uppermost entry is shifted down by two and the newly dispatched instruction is stored not in the top entry, but in the next to top entry. Accordingly, two shifts are required at cycle n. On cycle n+1, another single instruction is to be dispatched. However, in this case, the top entry is available. Consequently, only the to entry needs to be activated to receive the new instruction. Therefore, only one shift is required for cycle n+1. Next, on cycle n+2, two instructions are to be dispatched. Therefore, the queue must shift entries to make room for both instructions. In order to accomplish this, the entry fifth from the top of the queue is shifted by two (as indicated by shift2), and the upper five entries are activated to receive a shift by two as well (as indicated by shift2). Therefore, 6 shifts are required at cycle n+2. The total number of shifts in this sequence is 9 which is an improvement over the approach depicted in Table 1.

Figure 2:
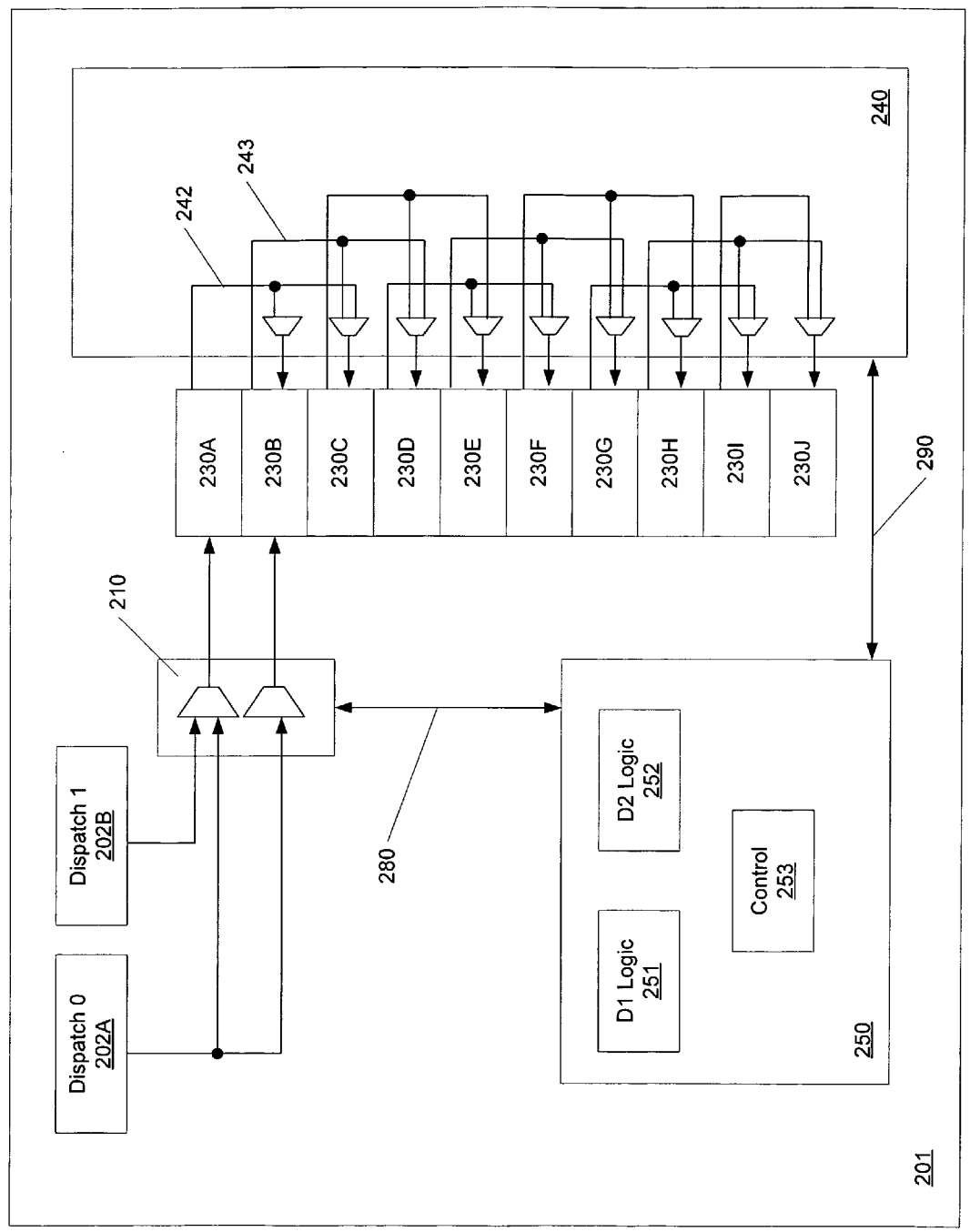
FIG. 2 is a block diagram depicting one embodiment of a processor including a portion of an apparatus for storing and shifting entries in a queue.

FIG. 2 depicts a block diagram illustrating one embodiment of a processor 201 including a mechanism for controlling shifts in a reservation station. As will be appreciated by those skilled in the art, the methods and mechanisms described herein may be applied to queues, arrays, and other storage structures in other than the reservation station context. For example, routers, switches, and other devices which receive and queue data may incorporate the methods and mechanisms disclosed herein.

In the embodiment shown, two dispatch positions 202A-202B coupled to multiplexing logic 210. Reservation station entries 230-230J are shown to be coupled to shifting logic 240. A control unit 250 is shown which includes logic 251 for managing the dispatch of a single instruction in a given cycle, logic 252 for managing the dispatch of two instructions in a given cycle, and control logic 253 for managing dispatch of instructions and shifting of data in the reservation station entries 230A-230J. In the example shown, control unit 250 is coupled to multiplexing logic 210 via signal(s) 280, and to shifting logic 240 via signal(s) 290. Those skilled in the art will appreciate there are numerous alternative ways in which the control logic in FIG. 2 may be implemented. All such alternatives are contemplated.

In the embodiment of FIG. 2, each of reservation station entries 230A-230H may be shifted to either the immediately following entry, or to the second following entry. In other words, each of entries 230A-230H may shift either one or two positions down. For convenience, entry 230A may be referred to as the "top" and entry 230J may be referred to as the "bottom". Entry 230I may only shift one position and entry 230J may only shift out of the reservation station as appropriate. Which entries 230 shift, and by how much, may generally be determined by control unit 250. For example, depending upon whether there are zero, one, or two instructions ready for dispatch, control unit 250 and the circuitry 251-253 included therein, may determine which entries 230 to shift and by how much. Generally speaking, as will be described below, the apparatus shown in FIG. 2 is configured to avoid activating shift logic when unnecessary, while also creating additional space through shifting already activated shift logic when possible.

Figure 3:
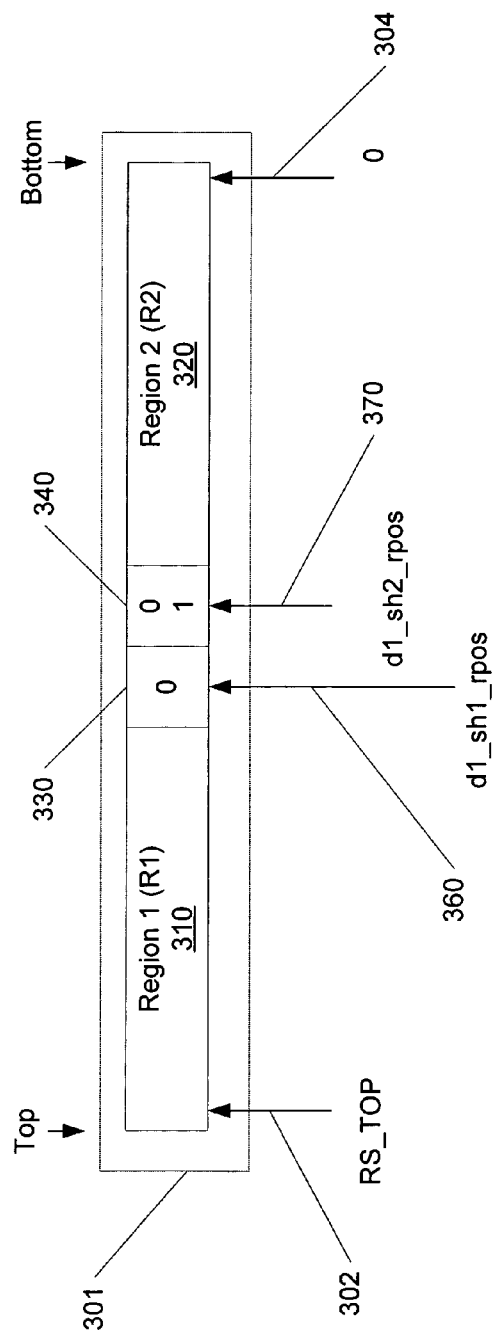
FIG. 3 depicts one embodiment of an approach for examining the state of a queue for the purpose of a single dispatch scenario.

Turning now to FIG. 3, one embodiment of an approach for performing shifts of reservation station entries 230 is described. FIG. 3 generally illustrates processing corresponding to the dispatch of a single instruction which may be performed (e.g., by control unit 250 and/or 251). In one embodiment, the state of the reservation station is examined to determine how shifting may be performed in the event a single instruction is dispatched. In the example shown, a reservation station 301 is shown. For purposes of discussion, the top (RS_TOP) 302 is shown to the left of the reservation station 301, and the bottom 304 to the right. Generally speaking, the state of the reservation station entries are examined to determine whether certain conditions exist. Depending upon the conditions detected, differing shift operations may be performed.

A first condition which may exist with respect to the reservation station 301 is when the top 302 entry of the reservation station is currently available. If the first entry is available and a single instruction is to be dispatched, then no shifting is necessary and none is performed. Consequently, shift logic is not unnecessarily activated.

A second or third condition which may exist is the condition where the top 302 entry is not available. In this case, the top entry 302 and one or more additional entries may be occupied as illustrated by Region 1 310 (R1) in FIG. 3. Following region 1 310 may be the bit sequence "00" or "01" (where "0" indicates an available entry, and "1" indicates an occupied entry), as depicted by bits 330 and 340. Following the bits 330 and 340 are entries which may or may not be occupied. As the top 301 entry must be available for the dispatch of an instruction, the region 1 310 entries must be shifted by at least one position to make room for the newly dispatched instruction.

In one embodiment, if region 1 310 is followed by only a single available entry ("second condition"), then the region 1 310 entries are shifted only a single position and the newly dispatched instruction is stored in the top entry 302 of the reservation station. However, if the region 1 310 entries are followed by two available entries (i.e., both entries 330 and 340 are available; the "third condition"), then the region 1 310 entries are shifted by two positions and a single dispatched instruction is stored in the entry which is next to the top 302 position. In this manner, the top entry 302 will remain available after the newly dispatched instruction is stored in the reservation station. In the example of FIG. 3, the entry 330 may be identified by an indication d1_sh1_rpos 360 which generally identifies a position region 1 310 will be shifted to if a single instruction is dispatched and region 1 310 is shifted by a single position (i.e., "d1_sh1_rpos"=dispatch 1, shift 1, reservation station position). Similarly, in the event of a second consecutive zero 340, the second entry position 340 may be identified by an indication d1_sh2_rpos 370 which generally identifies a position region 1 310 will be shifted to if a single instruction is dispatched and region 1 310 is shifted by two positions (i.e., "d1_sh2_rpos"=dispatch 1, shift 2, reservation station position).

It is noted that because region 1 310 must be shifted by at least one position anyhow, the power consumption differential, if any, between shifting the reservation station entries one position or two positions is relatively small. As already noted when discussing FIG. 2, entries in the reservation station may shift directly to the following, or second following, positions. If region 1 310 is shifted only a single position to make room for the newly dispatched instruction, then following the dispatch of the instruction the top entry 302 will again be occupied. Therefore, region 1 310 will have to shift again on the following dispatch. However, if region 1 310 is shifted by two positions to make room for a single instruction, and the single instruction is stored in the entry next to the top entry 302, then the top entry 302 will be available and no shifting will be required if the next dispatch is of a single instruction.

Figure 4A:
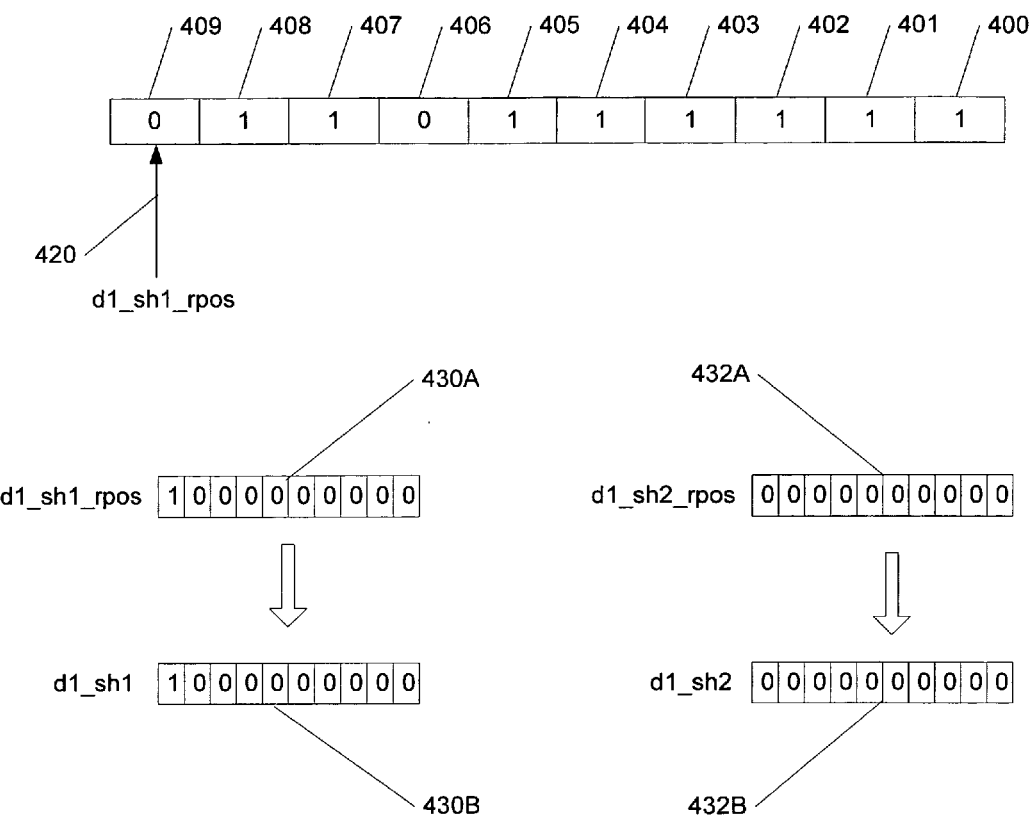
FIG. 4A illustrates an example of one embodiment of determining shift vectors for a single dispatch scenario.
Figure 4B:
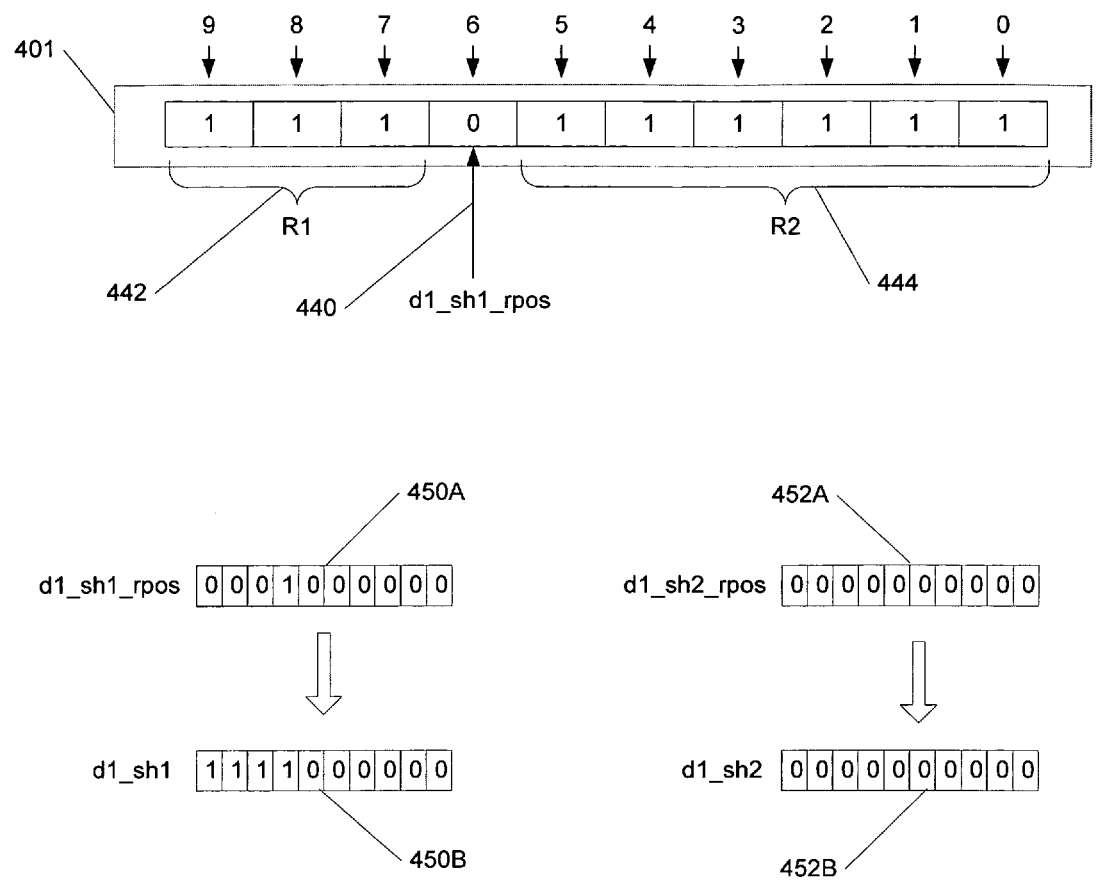
FIG. 4B illustrates an example of one embodiment of determining shift vectors for a single dispatch scenario.
Figure 4C:
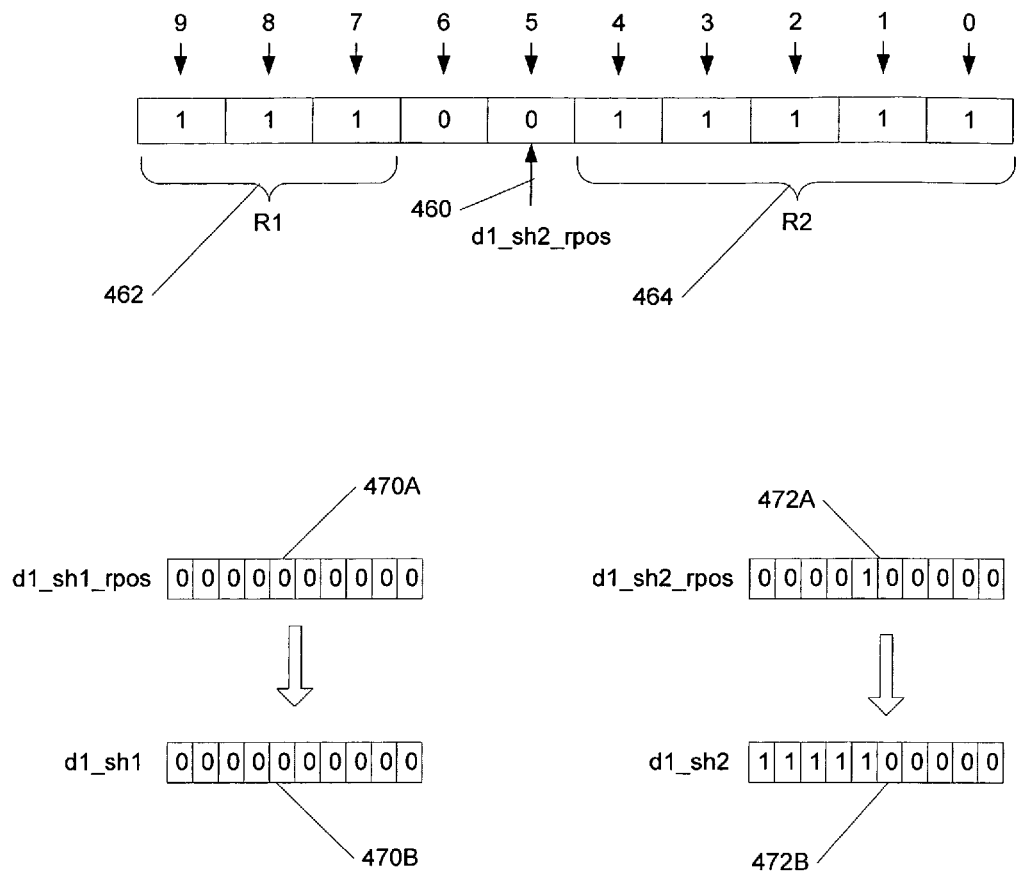
FIG. 4C illustrates an example of one embodiment of determining shift vectors for a single dispatch scenario.

FIGS. 4A-4C provide an example of each of the above described three conditions. FIG. 4A illustrates the condition wherein the top entry of the reservation station is available. In the example shown, reservation station entries 400-409 are depicted, with the top entry 409 being shown to be available. Therefore, identifier d1_sh1_rpos 420 identifies entry 409. As there is no second consecutive zero, the indicator d1_sh2_rpos which was described in FIG. 3 is not present (e.g., is null) in this case. In one embodiment, the position indicators d1_sh1_rpos and d1_sh2_rpos are vectors with a number of bits equal to the number of entries in the reservation station. If the identified position exists (i.e., the first shift position or the second shift position), then a bit of the corresponding vector is set. For example, in FIG. 4A, the content of vector d1_sh1_rpos 420 is shown as vector 430A, and d1_sh2_rpos is shown as vector 432A. As shown, vector 430A has the bit position corresponding to entry 409 set. No bits are set in the vector 432A.

Subsequent to creating the vectors d1_sh1_rpos 430A and d1_sh2_rpos 432A, shift vectors are generated which indicate those entries of the reservation station that will be shifted into by one or by two. Generally speaking, the shift vectors are generated by setting all bits which are at, or above, the entry identified by the identification vector 430A or 432A. For example, a vector, d1_sh1 430B, is created which identifies the range of entries of the reservation station which will be shifted into by a shift of one. Similarly, a vector, d1_sh2 432B, is created which identifies the range of entries of the reservation station which will be shifted into by a shift of two. As vector 430A has only the uppermost bit set, the corresponding shift vector 430B also has only the uppermost bit set (i.e., the identified bit and all bits above the identified bit are set). As no bits are set in vector 432A, none in the corresponding shift vector d1_sh2 432B are set (i.e., none of the reservation station entries will be shifted into by a shift of two). Therefore, assuming only a single instruction is dispatched when the reservation has the state indicated by FIG. 4A, only the uppermost entry 409 will be activated to receive the newly dispatched instruction. No shifting of other entries of the reservation station are required, or are performed.

FIG. 4B illustrates a scenario in which existing reservation station entries may be shifted by one position in the event a single instruction is dispatched. In the example of FIG. 4B, a reservation station 401 is shown to include entries indexed as 0-9, with indexed entry 9 being the top. As before, there is a region 1 (R1) 442, and a region 2 (R2) 444. In this case, R1 442 is followed by only a single available entry (the second condition described above), therefore there is a shift one position identifier 440 (d1_sh1_rpos) which identifies the position of the available entry (indexed position 6). The content of the vector d1_sh1_rpos is shown as vector 450A and has the bit set which corresponds to indexed reservation station entry position 6. As there are not two consecutive available spaces (zeroes) in this example, the two shift position identifier d1_sh2_rpos 452A and corresponding vector 452B are both zero. Having identified the single available space following R1 442, the bits of the identification vector 450A are manipulated to set all bits at or above the identified entry. Accordingly, the shift vector d1_sh1 450B has all bits set which correspond to indexed entry 6 and above. The set bits of vector 450B indicates those reservation station 401 positions that will be shifted into by a shift of one. In this case, the entire region 1 442 is shifted by one.

Finally a third scenario is depicted for the single instruction dispatch case. FIG. 4C illustrates a reservation station state in which entries in region 1 will be shifted by two positions. As in FIG. 4B, reservation station entries indexed as 0-9 are shown. A first region R1 462 is followed by two consecutive available entries (5-6), which is followed by a second region R2 464. As there is not only a single available space following R1 462, the single shift identifying vector 470A and corresponding single shift vector 470B are both zero. In this case, the second available entry (entry position 5) is identified by identification vector d1_sh2_rpos 460, whose content is shown as vector 472A. Using the same approach as before, the shift vector 472B which corresponds to the identification vector 472A is generated by setting all bits of the vector 472B which are at or above the identified entry. Therefore, all bits at or above the entry position 5 are set in the shift vector 472B. Vector d1_sh2 472B indicates those entries of the reservation station which will be shifted into by a shift of two in the event of a single dispatched instruction.

Figure 5:
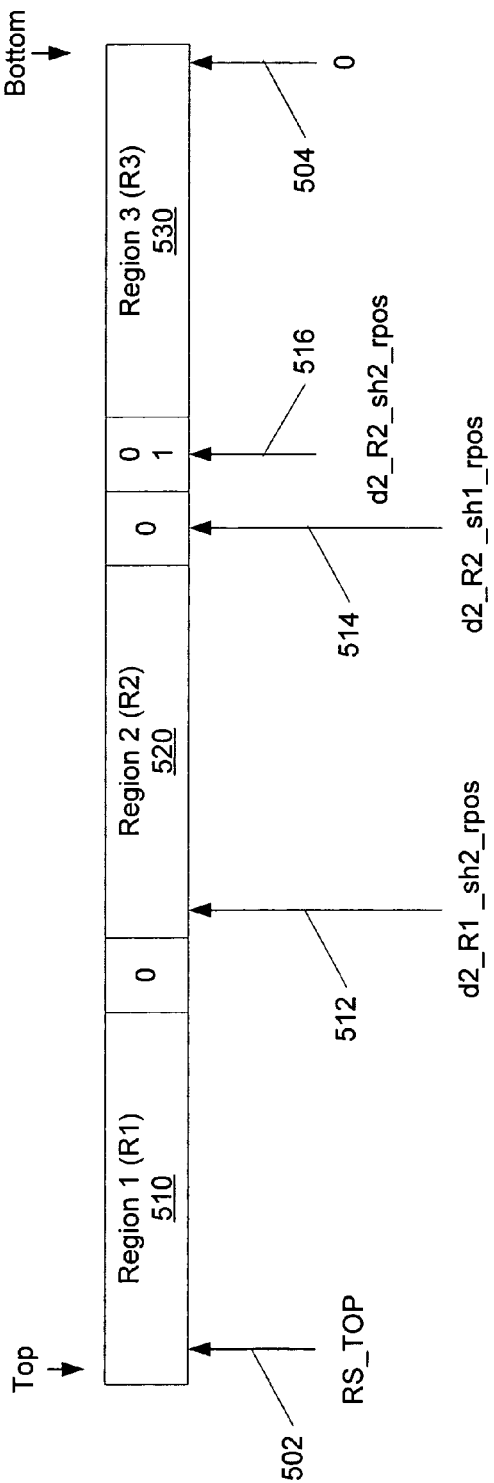
FIG. 5 depicts one embodiment of an approach for examining the state of a queue for the purpose of a double dispatch scenario.

Having examined various states of the reservation station and generated vectors which may be used for shifting entries in the event of a single dispatched instruction, we now turn to scenarios involving the concurrent dispatch of two instructions. FIG. 5 illustrates how the reservation station entries may be examined to identify various states. For the two instruction dispatch case, the reservation station is examined to identify if, and where, three separate regions may exist. A first region R1 510 is a region wherein one or more uppermost entries of the reservation station are occupied and are followed by a single available entry. If region R1 510 exists, then we know that R1 510 will have to shift by at least two positions in order to accommodate the concurrent dispatch of two instructions.

A second region R2 520 is a region of occupied entries separated from R1 510 by a single available entry, and is terminated by either a single available entry or two consecutive available entries (i.e., the "01" or "00" sequence described above). Given this definition of R2 520, it is known that only a single available entry exists above R2 520. Consequently, region R2 520 must shift by at least one position in the event of a two instruction dispatch. If region R2 520 is followed by only a single available entry, the region R2 520 can only shift down by one position. If region R2 520 is followed by two consecutive available entries, then region R2 520 must still shift by at least one position, but may shift by two positions. Region R3 530 is any additional entries below region R2 520. It is noted that region R3, if it exists, may include occupied and/or unoccupied entries.

With respect to examining the state of the reservation station for purposes of the two instruction dispatch case, various identifying and shift vectors are determined as was the case for the single dispatch scenario. In the example of FIG. 5, the top of the reservation station is indicated by identifier RS_TOP 502, and the bottom is indicated by identifier 504. First calculated are various position identifying vectors. A first vector, d2_R1_sh2_rpos 512 (where "d2"="dispatch 2", "R1"="Region 1", and "sh2"="shift 2") is calculated which identifies the position that region R1 510 (if it exists) will be shifted to in the event of a two instruction dispatch. Therefore, d2_R1_sh2_r_pos 512 identifies the entry immediately following the single available entry after region R1 510.

Two additional position vectors are then calculated which generally indicate a first, and possible second, position that region R2 520 will be shifted to if two instructions are concurrently dispatched. If region R2 520 is followed by only a single available entry, the single available entry is identified by identifier d2_R2_sh1_rpos 514 (where "d2"="dispatch 2", "R2"="Region 2", and "sh1"="shift 1"). If region R2 520 is followed by two consecutive available entries, then the second available entry is identified by identifier d2_R2_sh2_rpos 516 (where "d2"="dispatch 2", "R2"="Region 2", and "sh2"="shift 2"). Having determined the position identifiers, various shift vectors may be determined as described below.

Figure 6A:
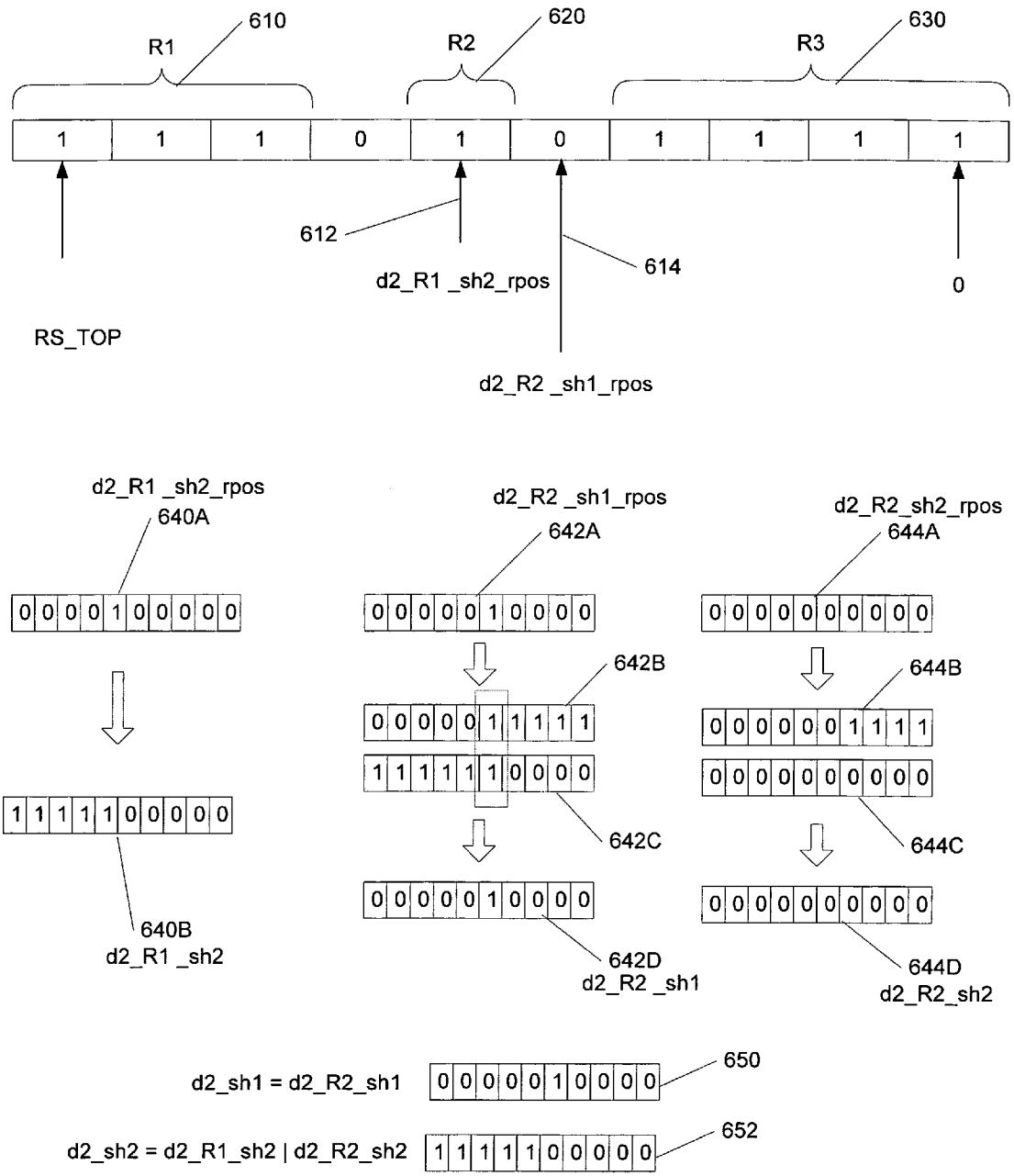
FIG. 6A illustrates an example of one embodiment of determining shift vectors for a double dispatch scenario.

If the reservation station has two consecutive available entries at the top and two instructions are concurrently dispatched, no shifting of existing entries is required or performed. However, if such entries are not available, some shifting will be required. FIG. 6A illustrates a scenario in which the uppermost entries of a reservation station are occupied. In order to perform the shifting necessary to accommodate the concurrent dispatch of two instructions, the position vectors described in FIG. 5 are determined. In the example, the reservation station includes a first region R1 610, a second region R2 620, and a third region R3 630. Position identifier d2_R1_sh2_rpos 612 is shown to identify the entry immediately after the available space after region R1 610. The content of identifier d2_R1_sh2_rpos 612 is shown as vector 640A. Region R2 620 is followed by only a single available space which is identified by d2_R2_sh1_rpos 614. The content of identifier d2_R2_sh1_rpos 614 is shown as vector 642A. As there is not a second consecutive available space following region R2 620, a position identifier d2_R2_sh2_rpos is zero as shown by vector 644A.

Having determined the position vectors, shift vectors are determined which are used to identify those entries of the reservation station which are shifted into by a shift of one, and/or a shift of two. A first shift vector is determined which identifies shifting of region R1 610. In this case, region R1 610 will be shifted by two positions in the event of a two instruction dispatch. The region R1 610 shift vector is then determined by setting all bits of the shift vector which are at or above the position identified by position vector d2_R1_sh2_rpos 640A, and the resulting shift vector d2_R1_sh2 640B.

As region R2 620 may shift by one or by two, two shift vectors are determined for region R2 620. A first vector, d2_R2_sh1 642D, is used to identify the entries of the reservation station that will be shift into by a shift of one of region R2 620. In order to determine d2_R2_sh1 642D, the identifier 614 and corresponding vector 642A are used. First, a vector 642B is generated by setting all bits beginning at or below the position immediately below that identified by d2_R1_sh2_rpos 612. Therefore, vector 642B has the lowest five bits set. Then a second vector 642C is generated by setting all bits at or above the position identified by identifier d2_R2_sh1_rpos 614. Therefore, the uppermost six bits of vector 642C are set. Shift vector d2_R2_sh1 642D is then calculated as the overlap of vectors 642B and 642C. As only a single bit overlaps between vectors 642B and 642C, the final shift vector 642D has only that single bit set which identifies the position which will be shifted into by region R2 620 by a shift of one.

To determine the positions of the reservation station which will be shifted into by region R2 620 by a shift of two, a vector d2_R2_sh2 644D is calculated. In order to calculate d2_R2_sh2 644D, a vector 644B is determined by setting all bits at or below the position which begins two entries below the entry identified by d2_R1_sh2_rpos 612. In this case, vector 644B has the lowest four bits set. Then a second vector 644C is determined by setting all bits at or above the position indicated by the identifier d2_R2_sh2_rpos 644A. As d2_R2_sh2_rpos 644A is zero in this example, no bits of vector 644C are set. Finally, the shift vector d2_R2_sh2 644D is determined to be the overlap between vectors 644B-644C. As there is no overlap in this case, the vector d2_R2_sh2 644D is zero. Given that no entries of region R2 620 can be shifted by two positions in this example, a zero vector d2_R2_sh2 644D is expected.

Having generated all of the shift vectors d2_R1_sh2 640B, d2_R2_sh1 642D, and d2_R2_sh2 644D, final shift vectors for the two dispatch case may be determined. Generally speaking, two shift vectors are determined for the two dispatch case. The first shift vector, d2_sh1 650, identifies those entries which will be shifted into by a shift of one, and the second shift vector, d2_sh2 652, identifies those entries of the reservation station that will be shifted into by a shift of two. The first shift vector d2_sh1 650 is equal to the vector d2_R2_sh1 642D. The second shift vector d2_sh2 652 is calculated to be the logical OR of vectors d2_R1_sh2 640B and d2_R2_sh2 644D.

Figure 6B:
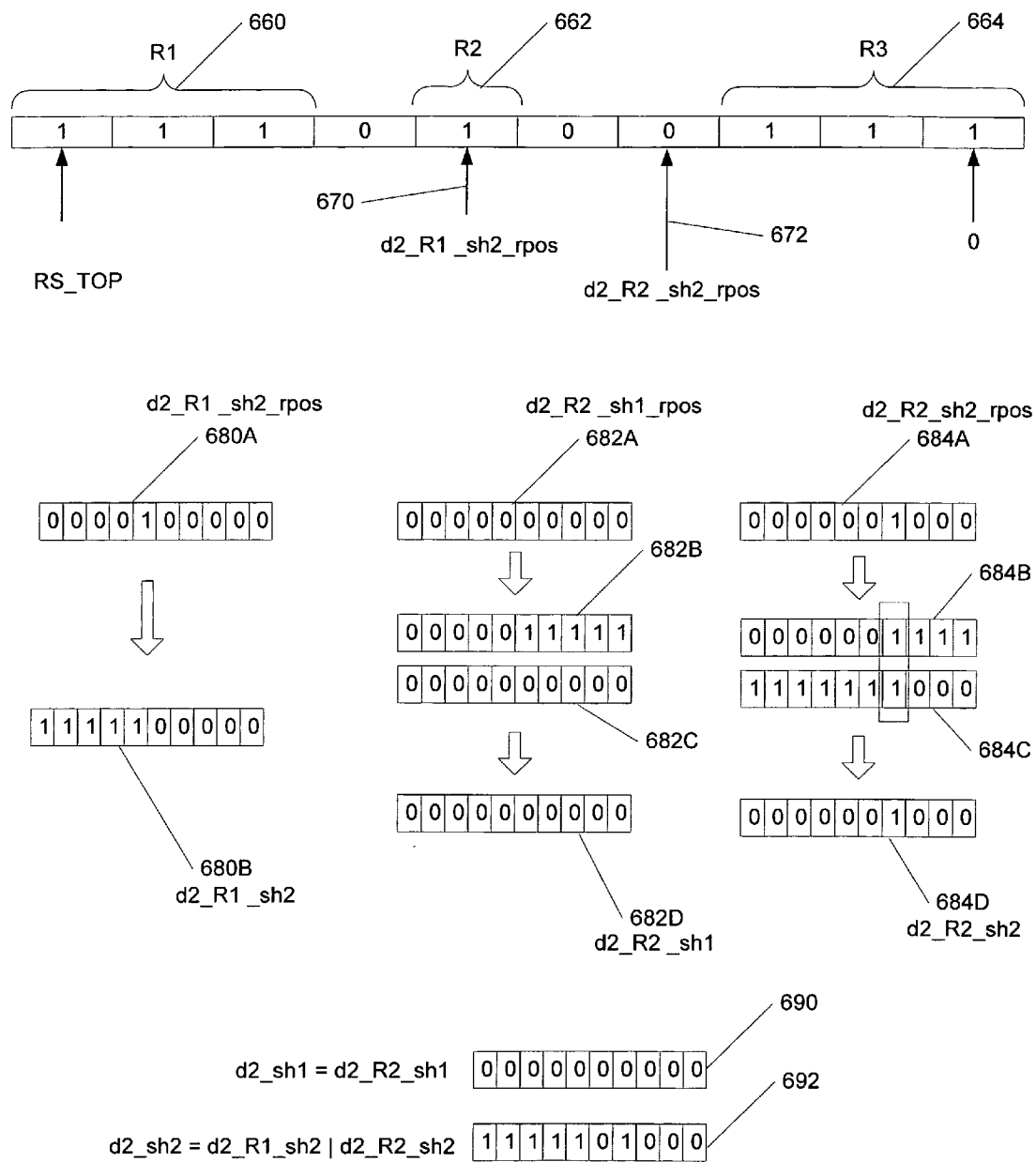
FIG. 6B illustrates an example of one embodiment of determining shift vectors for a double dispatch scenario.

FIG. 6B depicts a two dispatch scenario wherein a region 2 is followed by two consecutive available entries. In the example shown, three regions R1 660, R2 662, and R3 664 are identified. As before, identifier d2_R1_sh2_rpos 670 identifies the position immediately after the single available space following region R1 660. The second of the two consecutive spaces following region R2 662 is identified by d2_R2_sh2_rpos 672. Finally, as there is no single available space following region R2 662, d2_R2_sh1_rpos is zero as indicated by vector 682A. Based upon the identifier d2_R1_sh2_rpos 670 as indicated by vector 680A, the vector d2_R1_sh2 680B is determined by setting all bits at or above the position indicated by the vector 680A.

To determine the vector d2_R2_sh1 682D, a vector 682B is generated by setting all bits beginning at or below the position immediately below that identified by d2_R1_sh2_rpos 670. Therefore, vector 682B has the lowest five bits set. Then a second vector 682C is generated by setting all bits at or above the position identified by identifier d2_R2_sh1_rpos 682A. Therefore, none of the bits of vector 682C are set. Shift vector d2_R2_sh1 682D is then calculated as the overlap of vectors 682B and 682C. Consequently, none of the bits of d2_R2_sh1 682D are set in this case which generally indicates none of the region R2 662 entries will be shifted by only one position.

Finally, to determine the positions of the reservation station which will be shifted into by region R2 662 by a shift of two, a vector d2_R2_sh2 684D is calculated. In order to calculate d2_R2_sh2 684D, a vector 684B is determined by setting all bits at or below the position which begins two entries below the entry identified by d2_R1_sh2_rpos 670. In this case, vector 684B has the lowest four bits set. Then a second vector 684C is determined by setting all bits at or above the position indicated by the identifier d2_R2_sh2_rpos 684A. Therefore, the upper seven bits of vector 684C are set. Finally, the shift vector d2_R2_sh2 684D is determined to be the overlap between vectors 684B-684C. Therefore, the vector d2_R2_sh2 684D has the single bit fourth from the bottom set.

As before, having generated all of the shift vectors d2_R1_sh2 680B, d2_R2_sh1 682D, and d2_R2_sh2 684D, final shift vectors for the two dispatch case may be determined. The first shift vector d2_sh1 690 is equal to the vector d2_R2_sh1 682D. The second shift vector d2_sh2 692 is calculated to be the logical OR of vectors d2_R1_sh2 680B and d2_R2_sh2 684D. Accordingly, vector d2_sh2 692 has the upper five bits set and the seventh bit set.

Having generated shift vectors for both the single dispatch case and the double dispatch case, the shift vectors utilized in a given case depend upon the actual dispatch scenario. Therefore, if a single dispatch is detected, then the calculated single dispatch shift vectors are utilized to perform shifts (if any) as necessary. Similarly, if a double dispatch is detected, then the calculated double dispatch shift vectors are utilized to perform shifts (if any) as necessary. For example, in one embodiment, the D1 logic unit 251 of FIG. 2 may be configured to calculate the shift vectors for the single dispatch case. D2 logic 252 in FIG. 2 may calculate shift vectors for the double dispatch case. In response to detecting whether one or two instructions are being dispatched, the control logic 253 in FIG. 2 could then select to utilize the vectors generated by either the D1 logic 251 or the D2 logic 252. Of course, those skilled in the art will appreciate there are numerous alternative ways of controlling such functions.

Figure 7:
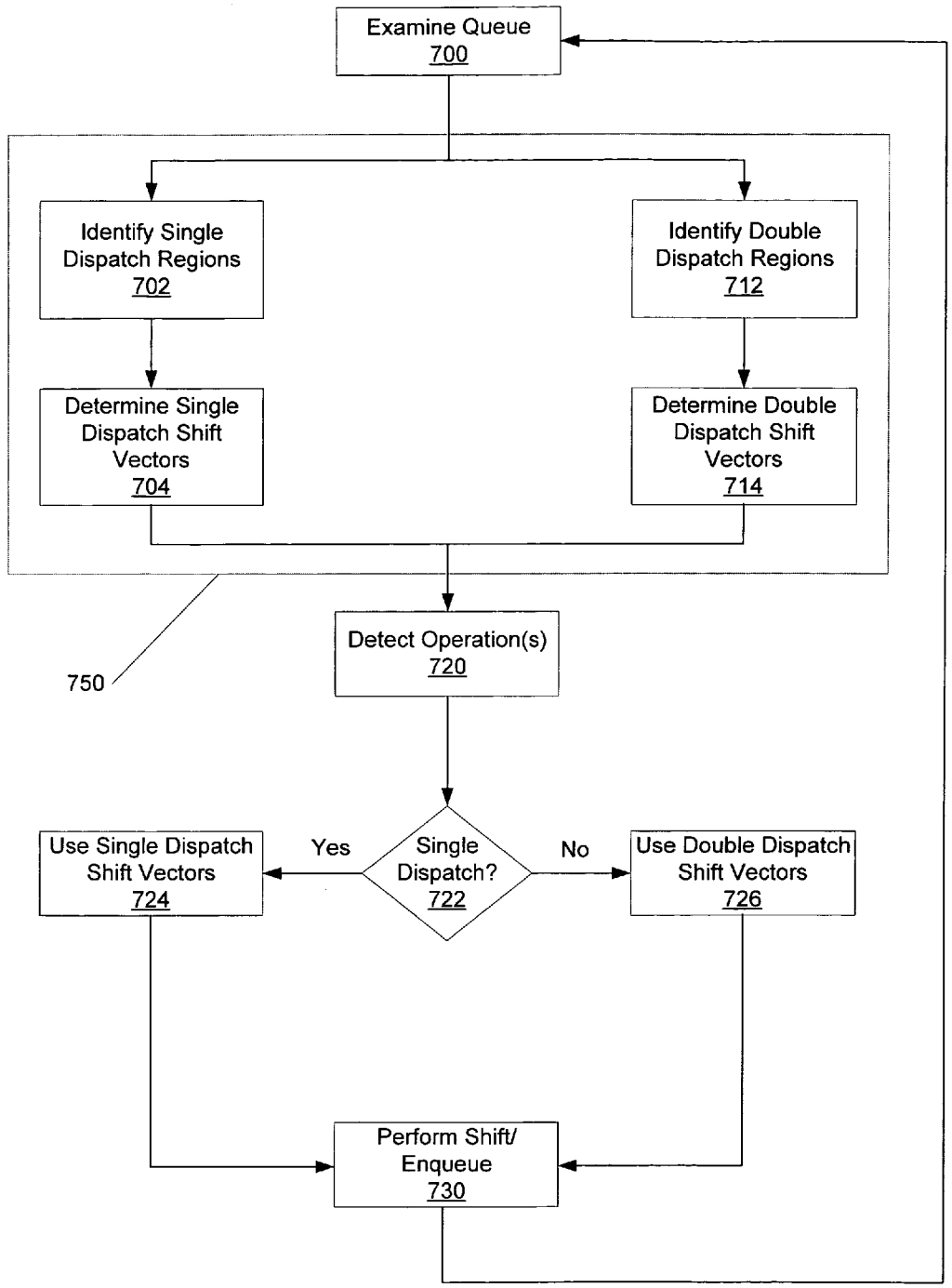
FIG. 7 depicts one embodiment of a method for performing shifts in a queue.

FIG. 7 illustrates one embodiment of a general overview of the process described in the foregoing. The first block 700 indicates that the state of the reservation station, or queue, is examined. As described above, regions for the single dispatch scenario are identified (block 702) and shift vectors for the single dispatch scenario are determined (block 704). In addition, regions for the double dispatch scenario are determined (block 712) and vectors for the double dispatch scenario are determined (block 714). Block 750 is identified in FIG. 7 to generally indicate that the operations corresponding to the single and double dispatch scenarios may be performed concurrently. Subsequently, a dispatch may be detected (block 720). If the dispatch is of a single instruction (decision block 722), then the previously determined single dispatch shift vectors may be used (block 724) and any shifts and enqueing performed (block 730). If the detected dispatch is not a single dispatch, but is a double dispatch (decision block 722), then the previously determined double dispatch vectors may be used (block 726) and any shifts and enqueing may be performed (block 730).

Numerous variations and modifications will become apparent to those skilled in the art once the above disclosure is fully appreciated. It is intended that the following claims be interpreted to embrace all such variations and modifications.

APPENDIX

```
/**********************************************************/
//
//      HDL For Calculating Reservation Shift Vectors
//      Copyright Advanced Micro Devices 2005
//
/**********************************************************/
/**********************************************************/
// Calculate Single Dispatch shift1 and shift2 vectors
/**********************************************************/
// APPROACH: Starting at top of shifting reservation station (RS), look
// for a contiguous string of occupied reservations stations, of length zero
// or greater.
// IF terminated by 01 (i.e. one hole), THEN shift the contiguous sequence
// of occupied RSs down by one entry (each of them).
// IF terminated by 00 (i.e. two holes), THEN shift the contiguous
// sequence of occupied RSs down by two entries (each of them).
/**********************************************************/
reg ['RS_ALL] disp1_sh1_rpos;
reg ['RS_ALL] disp1_sh2_rpos;
reg ['RS_ALL] disp1_sh1;
reg ['RS_ALL] disp1_sh2;
always @*
begin
    // Set position vector disp1_sh1_rpos
    // Search for a set of occupied RSs at the top of the array that are
    // are followed by a single hole. Set a bit at the index of the hole.
    disp1_sh1_rpos['RS_TOP] = ~rs_used['RS_TOP] & rs_used['RS_TOP-1];
    disp1_sh1_rpos[0] = &rs_used['RS_TOP:1]; for (i=1; i<-('RS TOP-1); i=i+1)
        disp1_sh1_rpos[i] = &rs_used['RS_TOP:i+1] & ~rs_used[i] & rs_used[i-1];
    // Set position vector disp1_sh2_rpos
    // Search for a set of occupied RSs at the top of the array that are
    // are followed by at least two holes. Set a bit at the index of the
    // 2nd hole.
    disp1_sh2_rpos['RS_TOP] = 1'b0;
    disp1_sh2_rpos['RS_TOP-1] = ~rs_used['RS_TOP] & ~rs_used['RS_TOP-1];
    for (i=0; i<-('RS TOP-2); i=i+1)
        disp1_sh2_rpos[i] = &rs_used['RS_TOP:i+2] & ~rs_used[i+1] & ~rs_used[i];
    // Now, generate shift-by-one and shift-by-two vectors at each index
    // where an entry will be shifted into.
    for (i=0; i<-'RS TOP; i=i+1)
        disp1_sh1[i] = |disp1_sh1_rpos[i:0];
    disp1_sh2['RS_TOP] = 1'b0;
    for (i=0; i<-('RS TOP-1); i=i+1)
        disp1_sh2[i] = |disp1_sh2_rpos[i:0];
end
/**********************************************************/
// If Calculate Double Dispatch shift1 and shift2 vectors
/**********************************************************/
// Calculate position vector disp2_R1_sh2_rpos
// Region 1 is always shifting down by two. Calculate a one-hot vector
// indicating position lower-most entry in R1 will shift-by-two into.
reg ['RS_ALL] disp2_R1_sh2_rpos;
always @*
begin
    disp2_R1_sh2_rpos['RS_TOP] = 1'b0;
    disp2_R1_sh2_rpos['RS_TOP-1] = ~rs_used['RS_TOP];
    for (i=0; i<-('RS TOP-2); i=i+1)
        disp2_R1_sh2_rpos[i] = &rs_used['RS_TOP:i+2] & ~rs_used[i+1];
end
// Find Beginning of Region 2
// for disp2_R2_sh1_rpos and disp2_R2_sh2_rpos, check for a single hole
// in various rs_used['RS_TOP:i] ranges. If onehole topdownto[i] is true,
// then there's one hole in the range rs_used['RS_TOP:i]. reg ['RS_TOP:2]
onehole_topdownto;
always @*
begin
    onehole_topdownto['RS_TOP] = ~rs_used['RS_TOP];
    for (i=2; i<-('RS TOP-1); i=i+1)
        onehole_topdownto[i] = onehot(~rs_used['RS_TOP:i]);
end
// Calculate position vector disp2_R2_sh1_rpos
// Region 2 can shift by one or two entries. Calculate a one-hot vector
//indicating position lower-most entry in R2 will shift-by-one into.
reg ['RS_ALL] disp2_R2_sh1_rpos;
always @*
begin
    disp2_R2_sh1_rpos[RS_TOP] = 1'b0;
    disp2_R2_sh1_rpos['RS_TOP-1] = 1'b0;
    disp2_R2_sh1_rpos[0] = onehole_topdownto[2] & (rs_used[1:0] == 2'b10); for
```

APPENDIX-continued

```
        (i=1; i<-('RS_TOP-2); i=i+1)
            disp2_R2_sh1_rpos[i] = onehole_topdownto[i+2]
                                    & (rs_used[i+1:i-1] == 3'b101);
    end
// Calculate position vector disp2_R2_sh2_rpos
// Region 2 can shift by one or two entries. Calculate a one-hot vector
// indicating position lower-most entry in R2 will shift-by-two into.
reg ['RS_ALL] disp2_R2_sh2_rpos;
always @*
begin
    disp2_R2_sh2_rpos['RS_TOP] = 1'b0;
    disp2_R2_sh2_rpos['RS_TOP-1] = 1'b0;
    disp2_R2_sh2_rpos['RS_TOP-2] = 1'b0;
    for (i=0; i<-(RS_TOP-3); i=i+1)
        disp2_R2_sh2_rpos[i] = onehole_topdownto[i+3]
                                & (rs_used[i+2:i] = 3'b100);
end
// Calculate shift vector disp2_R1_sh2
// Given the region 1 shift2 right-position vector, obtaining the region 1
// shift2 vector is simply a matter of striping up to the top position.
reg ['RS_ALL] disp2_R1_sh2;
always @*
begin
    for (i=0; i<-'RS_TOP; i=i+1)
        disp2_R1_sh2[i] = |disp2_R1_sh2_rpos[i:0];
end
// Calculate shift vector disp2_R2_sh1
//Helper vectors for calculating the two-dispatch region 2 shift-by-one vector.
reg ['RS_ALL] disp2_R1_sh2_under_rpos;
reg ['RS_ALL] disp2_R2_sh1_rpos_up;
always @*
begin
// stripe a vector down from one below the position marked in disp2_R1_sh2_rpos to zero.
// This is because the hole between R1 and R2 disappears if R2 is shifted by one.
    disp2_R1_sh2_under_rpos['RS_TOP] = 1'b0;
    for (i=0; i<-('RS_TOP-1); i=i+1)
        disp2_R1_sh2_under_rpos[i] = |disp2_R1_sh2_rpos['RS_TOP:i+1];
// stripe a vector up from the position marked in disp2_R2_sh1_rpos
// up to the top.
    disp2_R2_sh1_rpos_up[0] = disp2_R2_sh1_rpos[0];
    for (i=0; i<='RS_TOP; i=i+1)
        disp2_R2_sh1_rpos_up[i] = |disp2_R2_sh1_rpos[i:0];
end
// The two-dispatch region 2 shift-by-one vector is simply the overlap
// between the vectors striping up or down from the R1 and R2 rpos vectors.
gate (disp2_R2_sh1['RS_ALL], disp2_R1_sh2_under_rpos['RS_ALL] &
                                    disp2_R2_sh1_rpos_up['RS_ALL]);
// Helper vectors for calculating the two-dispatch region 2 shift-by-two vector.
reg ['RS_ALL] disp2_R1_sh2_under2_rpos;
reg ['RS_ALL] disp2_R2_sh2_rpos_up;
always @*
begin
    // stripe a vector down from two below the position marked
    // in disp2_R1_sh2_rpos to zero.
    disp2_R1_sh2_under2_rpos['RS_TOP] = 1'b0;
    disp2_R1_sh2_under2_rpos['RS_TOP-1] = 1'b0;
    for (i=0; i<-('RS_TOP-2); i=i+1)
        disp2_R1_sh2_under2_rpos[i] = |disp2_R1_sh2_rpos['RS_TOP:i+2];
    // stripe a vector up from the position marked in disp2_R2_sh2_rpos
    // up to the top.
    for (i=0; i<='RS_TOP; i=i+1)
        disp2_R2_sh2_rpos_up[i] = |disp2_R2_sh2_rpos[i:0];
end
// The two-dispatch region 2 shift-by-two vector is simply the overlap
// between the vectors striping up or down from the R1 and R2 rpos vectors.
gate (disp2_R2_sh2['RS_ALL], disp2_R1_sh2_under2_rpos['RS_ALL] &
                                    disp2_R2_sh2_rpos_up['RS_ALL]);
// Form the final two-dispatch shift1 and shift2 vectors from the region 1 & 2
// shift vectors.
gate (disp2_sh1['RS_ALL], disp2_R2_sh1['RS_ALL]);
gate (disp2_sh2['RS_ALL], disp2_R1_sh2['RS_ALL] |disp2_R2_sh2['RS_ALL]);
//Finally, after having calculated in parallel the shift vectors for the three dispatch cases, we
// multiplex the shift vectors together based upon the actual dispatch conditions:
mux3d(shift1['RS_ALL],
~FR_OpDispatch0_6,                              {'RS_SIZE{1'b0}},
FR_OpDispatch0_6 &      ~FR_OpDispatch1_6   disp1_sh1['RS_ALL],
FR_OpDispatch0_6 &      FR_OpDispatch1_6    disp2_sh1['RS_ALL]);
mux3d(shift2['RS_ALL],
~FR_OpDispatch0_6,                              {'RS_SIZE{1'b0}},
```

APPENDIX-continued

```
FR_OpDispatch0_6 &    ~FR_OpDispatch1_6   disp1_sh2['RS_ALL],
FR_OpDispatch0_6 &    FR_OpDispatch1_6    disp2_sh2['RS_ALL]);
```

What is claimed is:

1. A method for managing entries of a queue, the method comprising:

examining a plurality of entries of the queue;

identifying a first double dispatch region, a second double dispatch region, and a third double dispatch region of the queue, wherein the first double dispatch region comprises one or more occupied uppermost entries of the plurality of entries, wherein the second double dispatch region comprises at least one occupied entry separated from the first double dispatch region by only one unoccupied entry, and wherein the third double dispatch region comprises one or more entries separated from the second double dispatch region by one or more unoccupied entries;

in response to detecting the concurrent dispatch of two instructions:

shifting entries of the first double dispatch region two positions; and either shifting entries of the second double dispatch region one position, in response to determining the second double dispatch region is separated from the third double dispatch region by only a single unoccupied entry; or shifting entries of the second double dispatch region two positions, in response to determining the second double dispatch region is separated from the third double dispatch region by at least two unoccupied entries.

2. The method of claim 1, further comprising:

identifying a first single dispatch region and a second single dispatch region of the queue, wherein the first single dispatch region comprises one or more occupied uppermost entries of the plurality of entries, and wherein the second single dispatch region comprises at least one occupied entry separated from the first single dispatch region by either one or two unoccupied entries;

in response to detecting the dispatch of a single instruction:

shifting entries of the first single dispatch region a single position, in response to determining the first single dispatch region is separated from the second single dispatch region by a single unoccupied entry; or shifting entries of the first single dispatch region by two positions, in response to determining the first single dispatch region is separated from the second single dispatch region by two unoccupied entries.

3. The method of claim 2, further comprising first vectors which identify entries of the queue which will be activated for shifting responsive to the dispatch of a single instruction, and second vectors which identify entries of the queue which will be activated for shifting responsive to the concurrent dispatch of two instructions.

4. The method of claim 3, wherein the first vectors include a vector which identifies entries of the queue to be activated for a single shift, and a vector which identifies entries of the queue to be activated for a double shift.

5. The method of claim 3, wherein the second vectors include a vector which identifies entries of the queue to be activated for a single shift, and a vector which identifies entries of the queue to be activated for a double shift.

6. An apparatus for managing entries of a queue, the apparatus comprising:

a queue including a plurality of entries; and a control unit configured to:

examine a plurality of entries of the queue; and identify a first double dispatch region, a second double dispatch region, and a third double dispatch region of the queue, wherein the first double dispatch region comprises one or more occupied uppermost entries of the plurality of entries, wherein the second double dispatch region comprises at least one occupied entry separated from the first double dispatch region by only one unoccupied entry, and wherein the third double dispatch region comprises one or more entries separated from the second double dispatch region by one or more unoccupied entries;

in response to detecting the concurrent dispatch of two instructions:

shift entries of the first double dispatch region two positions; and either shift entries of the second double dispatch region one position, in response to determining the second double dispatch region is separated from the third double dispatch region by only a single unoccupied entry; or shift entries of the second double dispatch region two positions, in response to determining the second double dispatch region is separated from the third double dispatch region by at least two unoccupied entries.

7. The apparatus of claim 6, wherein the control unit is further configured to:

identify a first single dispatch region and a second single dispatch region of the queue, wherein the first single dispatch region comprises one or more occupied uppermost entries of the plurality of entries, and wherein the second single dispatch region comprises at least one occupied entry separated from the first single dispatch region by either one or two unoccupied entries; and in response to detecting the dispatch of a single instruction:

shift entries of the first single dispatch region a single position, in response to determining the first single dispatch region is separated from the second single dispatch region by a single unoccupied entry; or shift entries of the first single dispatch region by two positions, in response to determining the first single dispatch region is separated from the second single dispatch region by two unoccupied entries.

8. The apparatus of claim 7, wherein the control unit is further configured to generate first vectors which identify entries of the queue which will be activated for shifting responsive to the dispatch of a single instruction, and generate second vectors which identify entries of the queue which will be activated for shifting responsive to the concurrent dispatch of two instructions.

9. The apparatus of claim 8, wherein the first vectors include a vector which identifies entries of the queue to be activated for a single shift, and a vector which identifies entries of the queue to be activated for a double shift.

10. The apparatus of claim 8, wherein the second vectors include a vector which identifies entries of the queue to be activated for a single shift, and a vector which identifies entries of the queue to be activated for a double shift.

11. A processor comprising:
   a first instruction dispatch position;
   a second instruction dispatch position; and
   a reservation station configured to store instructions dispatched from the first instruction dispatch position and the second instruction dispatch position in a queue, wherein the reservation station is configured to:
      examine a plurality of entries of the queue; and
      identify a first double dispatch region, a second double dispatch region, and a third double dispatch region of the queue, wherein the first double dispatch region comprises one or more occupied uppermost entries of the plurality of entries, wherein the second double dispatch region comprises at least one occupied entry separated from the first double dispatch region by only one unoccupied entry, and wherein the third double dispatch region comprises one or more entries separated from the second double dispatch region by one or more unoccupied entries;
      in response to detecting the concurrent dispatch of two instructions:
         shift entries of the first double dispatch region two positions; and either
         shift entries of the second double dispatch region one position, in response to determining the second double dispatch region is separated from the third double dispatch region by only a single unoccupied entry; or
         shift entries of the second double dispatch region two positions, in response to determining the second double dispatch region is separated from the third double dispatch region by at least two unoccupied entries.

12. The processor of claim 11, wherein the reservation station is further configured to:
   identify a first single dispatch region and a second single dispatch region of the queue, wherein the first single dispatch region comprises one or more occupied uppermost entries of the plurality of entries, and wherein the second single dispatch region comprises at least one occupied entry separated from the first single dispatch region by either one or two unoccupied entries; and
   in response to detecting the dispatch of a single instruction:
      shift entries of the first single dispatch region a single position, in response to determining the first single dispatch region is separated from the second single dispatch region by a single unoccupied entry; or
      shift entries of the first single dispatch region by two positions, in response to determining the first single dispatch region is separated from the second single dispatch region by two unoccupied entries.

13. The processor of claim 12, wherein the reservation station is further configured to generate first vectors which identify entries of the queue which will be activated for shifting responsive to the dispatch of a single instruction, and generate second vectors which identify entries of the queue which will be activated for shifting responsive to the concurrent dispatch of two instructions.

14. The processor of claim 13, wherein the first vectors include a vector which identifies entries of the queue to be activated for a single shift, and a vector which identifies entries of the queue to be activated for a double shift.

15. The processor of claim 13, wherein the second vectors include a vector which identifies entries of the queue to be activated for a single shift, and a vector which identifies entries of the queue to be activated for a double shift.

* * * * *